United States Patent [19]

Furuta et al.

[11] Patent Number: 5,369,567
[45] Date of Patent: Nov. 29, 1994

[54] FURNACE TEMPERATURE CASCADE CONTROL APPARATUS USING ADJUSTMENT INPUT

[75] Inventors: Katsuhisa Furuta, 44-15, Minami Oizumi 4-chome, Nerima-ku, Tokyo; Akira Abe, Tokyo; Akinori Ito, Tokyo; Hiroyuki Manabe, Tokyo, all of Japan

[73] Assignees: Ohkura Electric Co., Ltd.; Katsuhisa Furuta, both of Tokyo, Japan

[21] Appl. No.: 80,523

[22] Filed: Jun. 24, 1993

[30] Foreign Application Priority Data

Mar. 11, 1993 [JP] Japan ................... 5-051032

[51] Int. Cl.⁵ ................. G05B 13/04; G05D 23/30; G06F 15/46
[52] U.S. Cl. .................. 364/149; 364/131; 364/137; 364/150; 364/477; 364/557
[58] Field of Search ............. 364/148, 149, 150, 477, 364/557, 131, 132, 137, 138, 550, 551.01, 578; 432/24, 36, 51; 236/15 BG

[56] References Cited

U.S. PATENT DOCUMENTS

| | | | |
|---|---|---|---|
| 3,311,303 | 3/1967 | Noyes | 236/46 R |
| 3,911,347 | 10/1975 | Hartung | 318/632 |
| 4,255,133 | 3/1981 | Tanifuji et al. | 432/24 |
| 4,501,552 | 2/1985 | Wakamiya | 432/49 |
| 4,539,663 | 9/1985 | Ishibashi et al. | 369/34 |
| 4,688,180 | 8/1987 | Motomiya | 364/477 |
| 4,807,144 | 2/1989 | Joehlin et al. | 364/477 |
| 4,907,177 | 3/1990 | Curreri et al. | 364/557 |
| 4,948,365 | 8/1990 | Yuen | 432/112 |
| 4,982,347 | 1/1991 | Rackerby et al. | 364/557 |
| 5,003,160 | 3/1991 | Matsuo et al. | 219/494 |
| 5,099,442 | 3/1992 | Furuta et al. | 364/557 |

FOREIGN PATENT DOCUMENTS 0256842 2/1988 European Pat. Off. .
8807708 10/1988 WIPO .

OTHER PUBLICATIONS

Papers of Institute of Measurement and Automatic Control, vol. 22, No. 12, Dec. 1986, Katsuhisa Furuta, et al., "A Design of Learning Control System for Linear Multivariable Systems", pp. 6–13, with English abstract.

Papers of Institute of Measurement and Automatic Control, vol. 25, No. 8, Aug. 1989, Masaki Yamakita, et al., "Generation of Virtual Reference for Discrete System by Learning", pp. 39–45, with English abstract.

Primary Examiner—Paul Gordon
Attorney, Agent, or Firm—Oblon, Spivak, McClelland, Maier & Neustadt

[57] ABSTRACT

A furnace 1 runs while repeating a cycle in which the furnace inside temperature varies along a preset pattern of temperature change with time under the control of a primary controller 12, and adjustment input (r̂) being applied to an enlarged system including the furnace 1 and the controller 12 is renewed at the end of each cycle of operation, based partly on output from a dual system with respect to the enlarged system, so as to reduce error between the preset temperature and the furnace inside temperature in the next cycle. The temperatures of heaters 2 of the furnace 1 are controlled by a secondary controller 35, and the set values at the input of the secondary controller 35 are given by output signals (τ) from the primary controller 12 which responds to the furnace inside temperatures (y). The order of the dual system is reduced, and the renewal of the adjustment input (r̂) is quickened.

3 Claims, 8 Drawing Sheets

5,369,567

FURNACE TEMPERATURE CASCADE CONTROL APPARATUS USING ADJUSTMENT INPUT

BACKGROUND OF THE INVENTION

1. Field of the Invention

This invention relates to a cascade control apparatus for controlling furnace temperature by using adjustment input. In particular, the invention relates to a cascade control apparatus of learning type for controlling the temperature of a furnace operated in repetition of a preset pattern of temperature change with time, the apparatus using adjustment input which is renewed by its values in the preceding cycle of operation and the result of a preceding cycle of operation as compared with preset pattern.

2. Description of the Prior Art

There are furnaces which are operated in repetition of a preset pattern of temperature change with time. As a means for improving the temperature change of such repetitively operated furnace at each cycle of repetition by learning the temperature change in the preceding cycle so as to bring the actual temperature change close to the preset pattern, the inventors disclosed "a furnace temperature control apparatus using adjustment input" in their U.S. Pat. No. 5,099,442 issued Mar. 24, 1992.

The apparatus of U.S. Pat. No. 5,099,442 issued Mar. 24, 1992 will be briefly reviewed by referring to FIG. 2. A furnace 1 is heated by heaters 2, and temperature sensors 3 measure the heater temperatures and inside temperatures of the furnace 1. The output from the temperature sensors 3 are applied to a controller (corresponding to a primary controller 12 of the invention) through a converter 4 as state variables (x). Of the temperature sensor outputs, values of furnace inside temperature (y) are stored in an output memory 6. The preset pattern of furnace inside temperature change with time is stored in a preset temperature value memory 7 in the form of preset values (r) of the inside temperature.

In response to input signals including the preset values (r) from the preset temperature value memory 7, adjustment input (r̂) from an adjustment input memory 11, the above-mentioned state variables (x), and the furnace inside temperatures (y), the controller produces output or manipulating signals (τ) to be applied to the heaters 2. In the case of the previous control apparatus of U.S. Pat. No. 5,099,442 issued Mar. 24, 1992, secondary controller 35 of FIG. 2 is not used, and the manipulating signals (τ) are distributed to a plurality of heaters 2 through a D/A converter 5. Here, the adjustment input (r̂) is determined in such a manner that the error (e) between the preset value (r) and the furnace inside temperature (y) is reduced as the cycle of operation of the furnace 1 is repeated. The symbol (τ) for the manipulating signal corresponds to the symbol (u) in the above U.S. Patent.

Each time one cycle of the repetition, namely an entire pattern of furnace inside temperature change with time, such as the entire pattern of Curve 3 of FIG. 6(C) over 0–25 min, is finished, an adder 8 finds errors (e) between the preset temperature values (r) and the corresponding furnace inside temperatures (y) in the cycle Just finished. The errors (e) are applied to a dual system model 9 with respect to an enlarged system 40 (FIG. 1) consisting of the furnace 1 and the controller 12. Based on the outputs (v) from the dual system model 9 in response to the application of the errors (e) thereto and the values of the adjustment input (r̂) in the preceding cycle, i.e., the cycle just finished, an adjustment input generator 10 renews the values of the adjustment input (r̂) and the contents of the adjustment input memory 11 are replaced with the thus renewed values. Then, the next cycle of repetition starts.

The furnace temperature control apparatus using the adjustment input performs a kind of learning type control, because at the end of each cycle of the repetition it renews the values of the adjustment input for one cycle and then proceeds to the next cycle of repetition. Thus, such control apparatus has an advantage over non-learning type in that the actual furnace inside temperature change pattern is brought closer to the preset pattern each time the cycle of the repetition takes place.

SUMMARY OF THE INVENTION

The furnace temperature control apparatus of U.S. Pat. No. 5,099,442 issued Mar. 24, 1992 has a shortcoming in that the time necessary for renewing the adjustment input (r̂) is long, and at the end of each cycle of repetition the start of next cycle is delayed by waiting the completion of the renewal of the adjustment input (r̂). The reason for it is in that, for instance in the example of FIG. 2, the furnace inside temperature (y) is detected at three points, and to control three values of the furnace inside temperature (y), outputs from six temperature sensors 3 are all used in calculation at the controller for producing three manipulating output signals (τ) toward three heaters 2. More specifically, when the number of controlled variables (y) (to be referred to as "the order of control") is m (m=3 in FIG. 2), all of the state variables (x) of order s (s>m s=6 in FIG. 2) are used, and due to the large number of variables the calculation takes a long time.

Therefore, an object of the present invention is to provide such a furnace temperature control apparatus using adjustment input which is quick in the renewal calculation of the adjustment input values.

To shorten the renewal calculation time, the inventors noted the use of cascade system; namely, in FIG. 1, the temperatures (χ) of heaters 2 of the furnace 1 are controlled by a secondary controller 35, and the set values at the input of the secondary controller 35 are controlled by manipulating signals (τ) or output signals from a primary controller 12 which responds to the furnace inside temperatures (y).

BRIEF DESCRIPTION OF THE ACCOMPANYING DRAWINGS

For a better understanding of the invention, reference is made to the accompanying drawings, in which FIG. 1 is a block diagram of an embodiment of the invention;

Figure 6A:
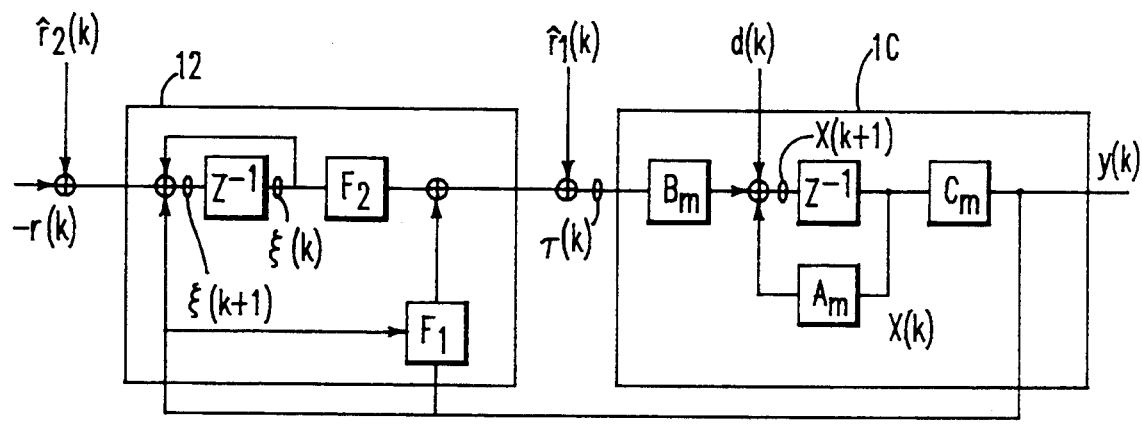
Figure 6B:
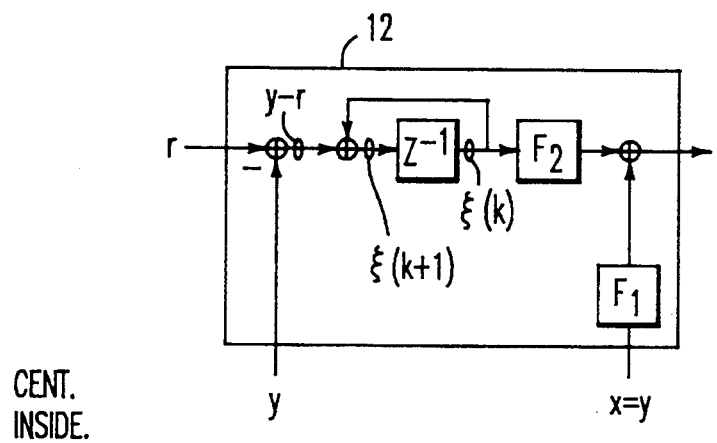
Figure 6C:
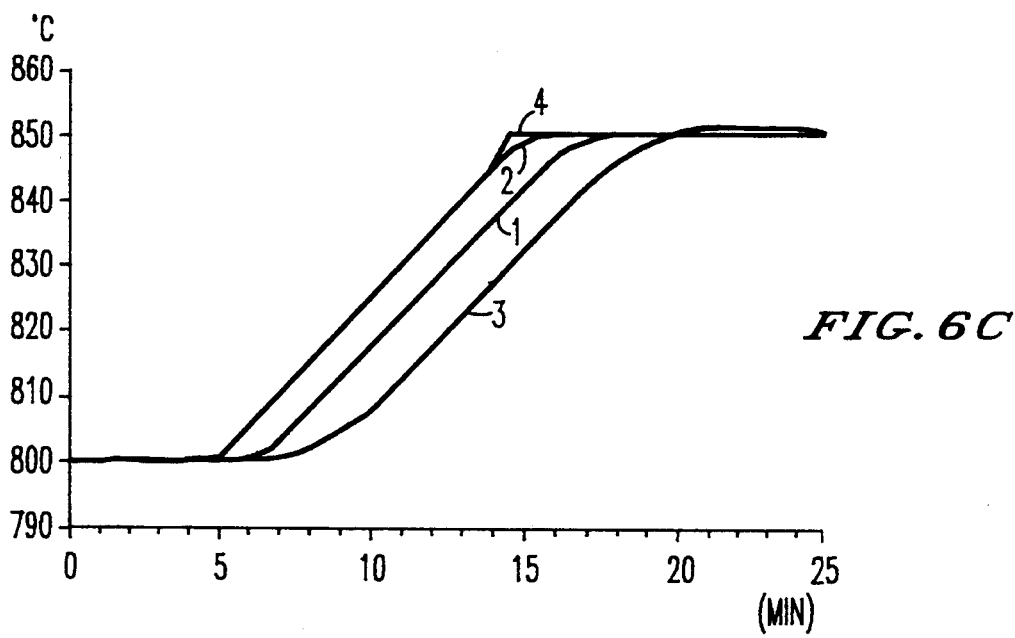
Figure 7:
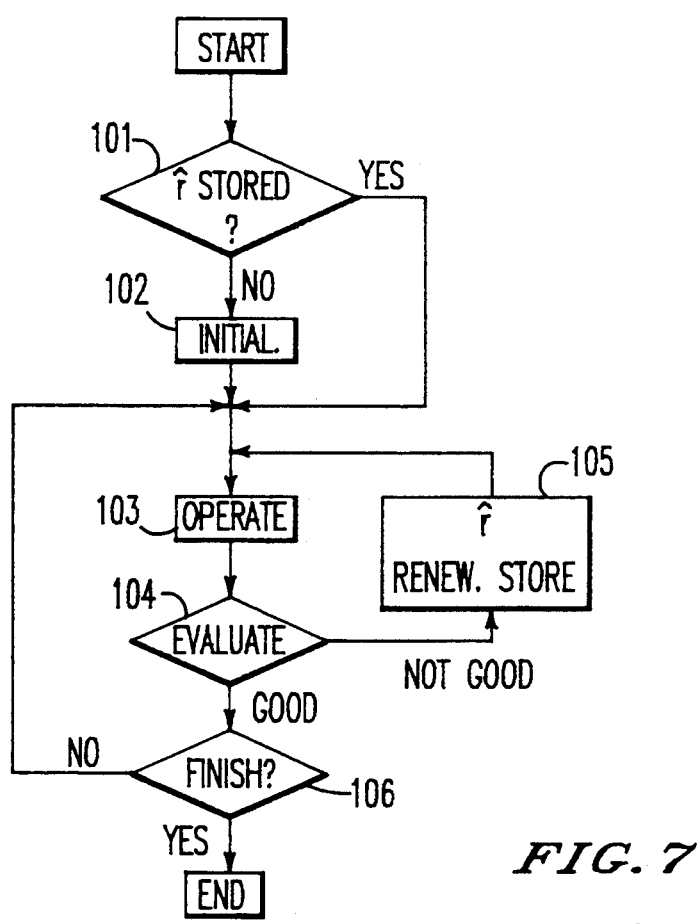

FIG. 6A, 6B, and 6C show block diagrams of a controller and a controller-added-furnace and curves indicating preset pattern of temperature change and the result of temperature control by the method of the invention;

FIG. 7 is a flow chart of the operation of the apparatus of the invention; and

Figure 8:
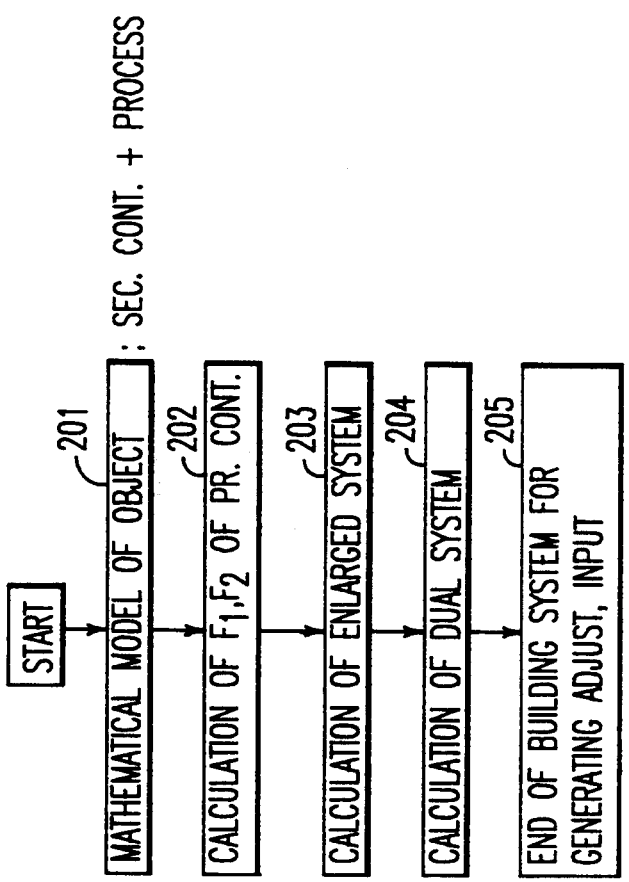

FIG. 8 is a flow chart of a process for building a mechanism of calculation of adjustment input value.

DESCRIPTION OF THE PREFERRED EMBODIMENT

Figure 1:
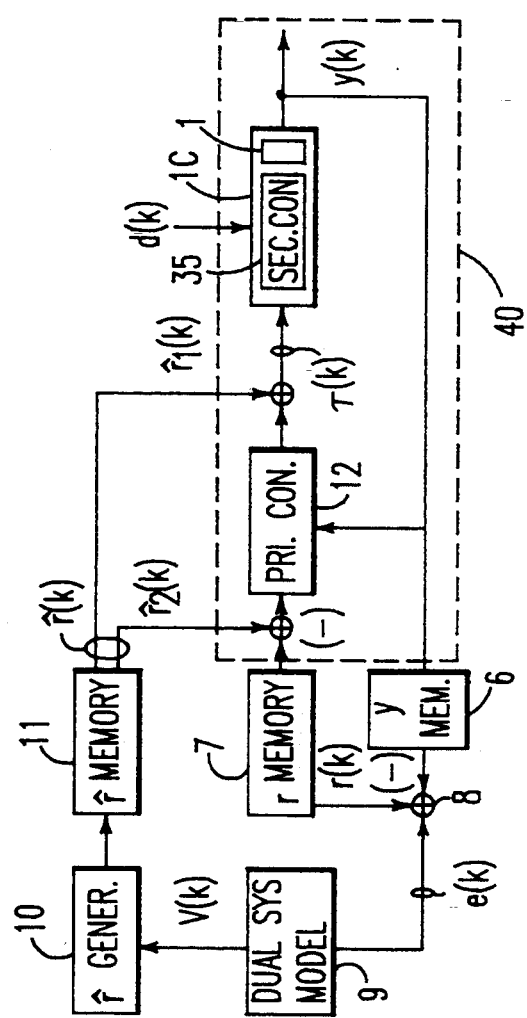

In the embodiment of FIG. 1, a primary controller 12 controls the inside temperature (y) of a furnace 1 having heaters 2, which furnace is run repetitively along a preset pattern of temperature change with time. The preset pattern is given in the form of preset values (r) of furnace inside temperature. A secondary controller 35 is connected between the primary controller 12 and the furnace heaters 2 and operates so as to minimize the difference between manipulating signals ($\tau$) from the primary controller 12 and the temperatures of the furnace heaters 2. An adjustment input memory 11 stores values of adjustment input ($\hat{r}$) for the period of the above-mentioned preset pattern, which period is referred to as a cycle of repetition. The adjustment input memory 11 is such that the adjustment input ($\hat{r}$) is applied to an enlarged system that consists of the furnace 1 with heaters 2, the primary controller 12, and secondary controller 35, in synchronism with application of the preset temperature value (r) thereto. Errors (e) between the furnace inside temperatures (y) for a cycle of repetition and the corresponding preset temperature values (r) are applied to a dual system model 9 with respect to the enlarged system 40 under the condition of being disconnected from the preset temperature values (r). An adjustment input generator 10 renews the values of adjustment input ($\hat{r}$) at the end of each cycle of repetition, based on the adjustment input ($\hat{r}$) values in the preceding cycle and the output from the dual system model 9 in response to application of the errors (e) thereto.

Figure 3:
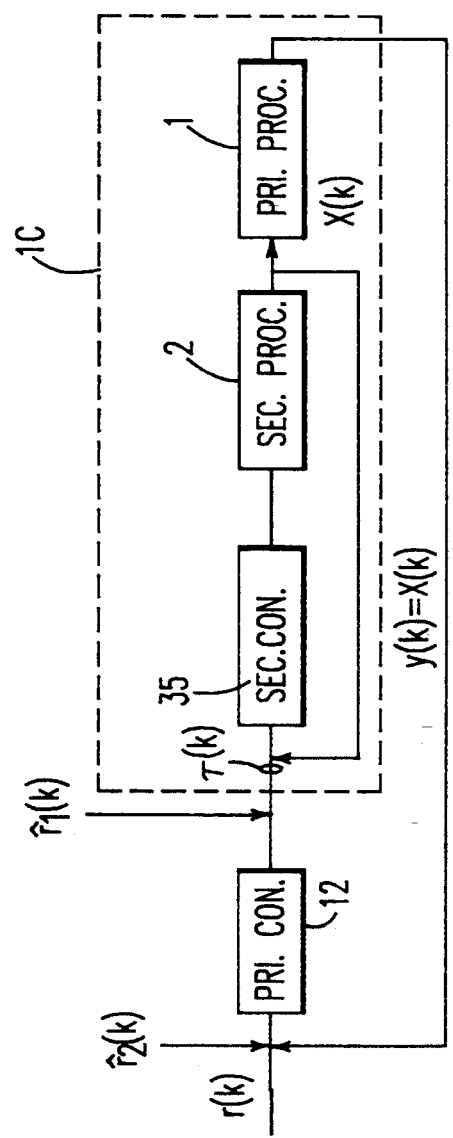
FIG. 3 is a block diagram showing the relationship between the furnace and the secondary controller.
Figure 4:
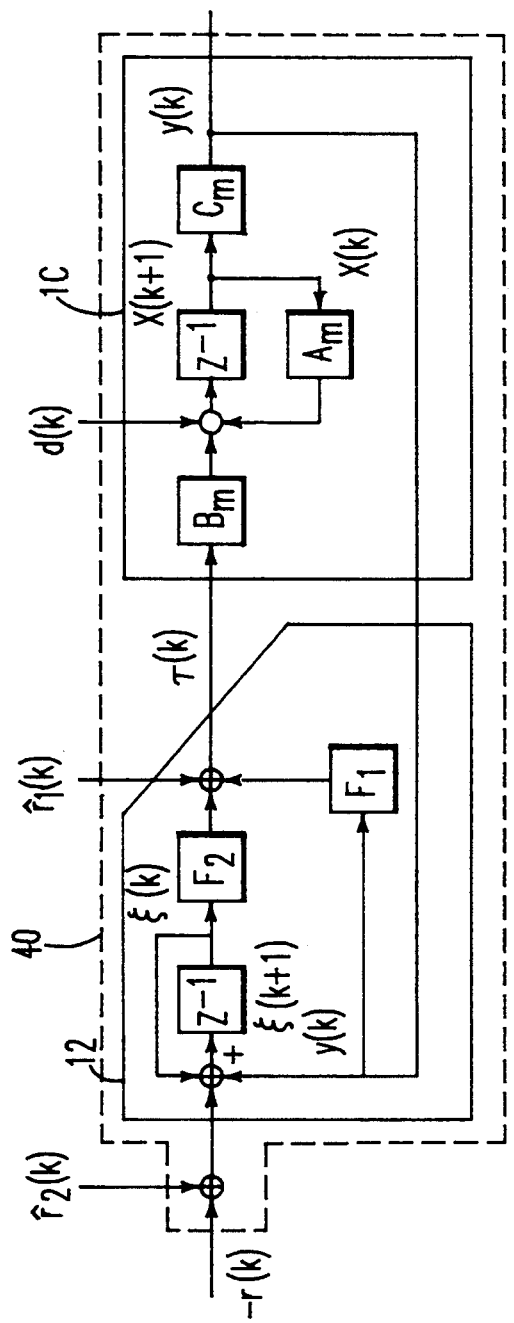
FIG. 4 is a block diagram of an enlarged system.

Preferably, the primary controller 12 is simulated by a model with real coefficients $F_1$ and $F_2$ (FIG. 4). A model with real coefficients $A_m$, $B_m$, $C_m$ (FIG. 4) for a controller-added-furnace 1C (FIGS. 1, 2 and 3) consisting of the secondary controller 35 and the furnace 1 with heaters 2 is identified, for instance, by applying a rectangular wave to the input side of the secondary controller 35 and measuring the variation of the furnace inside temperature (y) in response thereto. The dual system model of the enlarged system 40 can be determined by using the model of the primary controller 12 and the model of the controller-added-furnace 1C.

Before entering into further details of the embodiment, the principle of invention will be described by in following steps.

Figure 5:
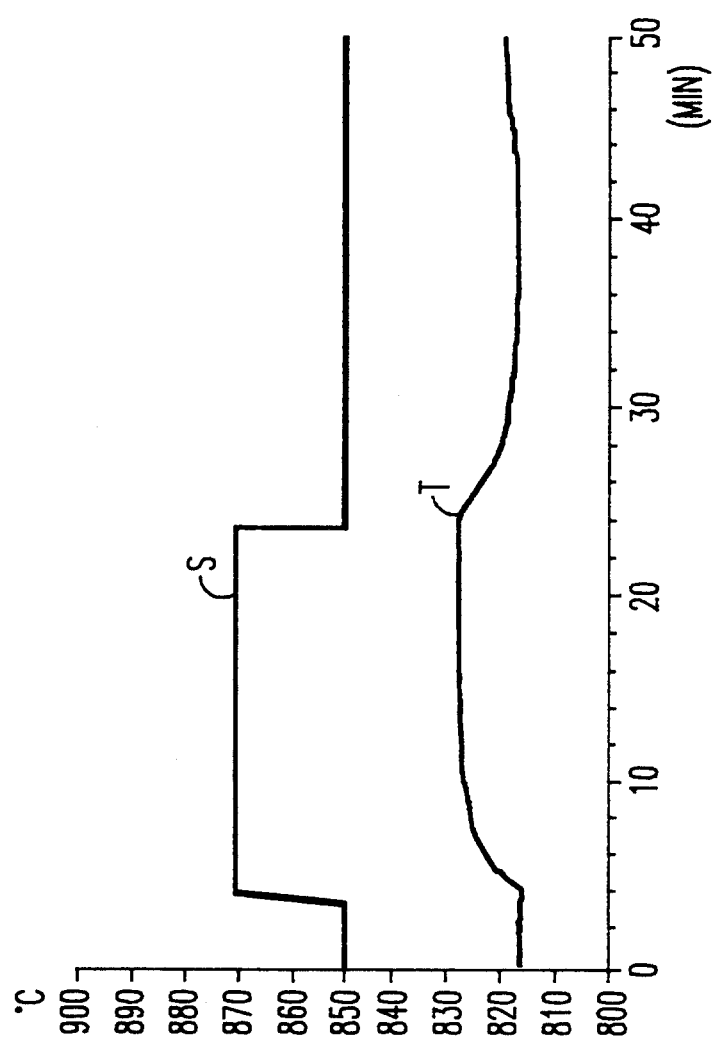
FIG. 5 is a graph of signals which are used in identifying a model of a furnace having a secondary controller connected thereto.

I. Identification of a model for controller-added-furnace
II. Adjustment input for a control system including a controller-added-furnace model
III. Example I. Identification of a model for controller-added-furnace Referring to FIG. 4, a model with real coefficients $A_m$, $B_m$, $C_m$ (FIG. 4) for a controller-added-furnace 1C (FIGS. 1, 2 and 3) consisting of the secondary controller 35 and the furnace 1 with heaters 2 can be identified as follows. Namely, a rectangular wave, e.g., the curve S of FIG. 5, is applied to the input side of the secondary controller 35 as a manipulating variable ($\tau$). The variation of the furnace inside temperature (y) in response thereto, e.g., the curve T of FIG. 5, is measured. The real coefficients $A_m$, $B_m$, $C_m$ are determined by processing the measured values, such as the curves S and T of FIG. 5, with the generalized least squares method. Such identification of model belongs to the public knowledge. In the identifying process, the manipulating variables ($\tau$) act as preset values of temperature ($\chi$) of the furnace heaters 2, and controlled variables (y) are the furnace inside temperatures.

When the controller-added-furnace 1C is digitally controlled, the state variables (x) of such controller-added-furnace 1C are given by the following discrete state equations, and its temperature control is generally treated as a servo problem using the multi-variable control theory.

$$x(k+1) = A_m \cdot x(k) + B_m \cdot \tau(k) \quad (1a)$$

$$y(k) = C_m \cdot x(k) \quad (1b)$$

here,
x(k): state variables at time k,
$\tau$(k): manipulating variable at time k,
y(k): controlled variable at time k,
$A_m$ is an m-row m-column matrix of real coefficients,
$B_m$ is an m-row p-column matrix of real coefficients,
$C_m$ is an m-row m-column matrix of real coefficients.

Thus, the state variables x are a vector of m order, the manipulating variables $\tau$ are a vector of p order, and the controlled variables y are a vector of m order. In the embodiment of FIG. 1, m=p=3.

The above equations (1a) and (1b) coincide with the state equations for the furnace 1 controlled by the controller in the previous furnace temperature control apparatus in U.S. Pat. No. 5,099,442 issued Mar. 24, 1992, except the order of the real coefficient matrices and the values of elements thereof. Hence, an enlarged system 40 consisting of the primary controller 12 and the controller-added-furnace 1C can be shown by the block diagram of FIG. 4.

II. Adjustment input for a control system including a controller-added- furnace model When formation of the primary controller 12 can be represented by the block diagram of FIG. 6(B), the change of state variables of the enlarged system 40 of FIG. 6(A) comprising the controller-added-furnace 1C and the controller 12 with lapse of time (k) can be given by the following equations (2a) and (2b).

$$\begin{bmatrix} x(k+1) \\ \xi(k+1) \end{bmatrix} = \begin{bmatrix} A_m + B_m F_1 & B_m F_2 \\ C_m & I \end{bmatrix} \begin{bmatrix} x(k) \\ \xi(k) \end{bmatrix} + \begin{bmatrix} B_m & 0 \\ 0 & I \end{bmatrix} \begin{bmatrix} \hat{r}_1(k) \\ \hat{r}_2(k) \end{bmatrix} + \begin{bmatrix} 0 \\ -I \end{bmatrix} r(k) + \begin{bmatrix} I \\ 0 \end{bmatrix} d(k) \quad (2a)$$

$$y(k) = [C_m \; 0] \begin{bmatrix} x(k) \\ \xi(k) \end{bmatrix} \quad (2b)$$

here, $F_1$ and $F_2$ are matrices of real coefficients, and I is a unit matrix. With the definitions of following equation (3), the equations (2a) and (2b) can be simplified as follows.

$$X(k) = \begin{bmatrix} x(k) \\ \xi(k) \end{bmatrix} \quad \underline{A} = \begin{bmatrix} A_m + B_m F_1 & B_m F_2 \\ C & I \end{bmatrix} \quad (3)$$

$$\hat{\underline{r}} = \begin{bmatrix} \hat{r}_1(k) \\ \hat{r}_2(k) \end{bmatrix} \quad \underline{B} = \begin{bmatrix} B_m & 0 \\ 0 & I \end{bmatrix}$$

$$\underline{C} = [C_m \; 0] \quad \underline{G}_1 = \begin{bmatrix} 0 \\ -I \end{bmatrix} \quad \underline{G}_2 = \begin{bmatrix} I \\ 0 \end{bmatrix}$$

$$X(k) = \underline{A} \cdot X(k) + \underline{B} \cdot r(k) + \underline{G}_1 \cdot \hat{\underline{r}}(k) + \underline{G}_2 \cdot d(k) \quad (4a)$$

$$y(k) = \underline{C} \cdot X(k) \quad (4b)$$

It is intended to select the values of the adjustment input $\hat{r}$ in such a manner that, in the system with the characteristics given by the equations (4a) and (4b), the errors e(k) between the preset temperature values (r) and the controlled variables y(k) {e(k)=r(k)-y(k)} are reduced as the cycle, i.e., the operation of the furnace for the preset pattern of temperature change, is repeated. If the controlled variable, i.e., the furnace inside temperature y(k) is sampled n times per cycle {k=0-(n−1)}, the ith set $\rho^i$ of the adjustment inputs $\hat{r}$ for the ith cycle of repetition can be written as follows.

$$\rho^i = \begin{vmatrix} \hat{r}(0) \\ \hat{r}(1) \\ \cdot \\ \cdot \\ \cdot \\ \hat{r}(n-2) \\ \hat{r}(n-1) \end{vmatrix}$$

The adjustment inputs $\hat{r}(k)$ of the set $\rho^i$ must fulfill the conditions of the following equations, the derivation of which has been described in detail in the above U.S. Patent.

$$\rho^{i+1} = \rho^i + \epsilon^i V^i \quad (5)$$

Here, $\epsilon^i$ is a constant which determines the speed of convergence of the set $V^i$ of the variables v(k), which set is given by $$v^i = \begin{vmatrix} v(0) \\ v(1) \\ \cdot \\ \cdot \\ \cdot \\ v(n-2) \\ v(n-1) \end{vmatrix}$$

The values of the variable v(k) can be determined from the above errors (e) through an intermediate variable η(k) by using the following equations.

$$\eta(k) = \underline{A}^T \cdot \eta(k+1) + \underline{C}^T \cdot e(k+1) \quad (6a)$$

$$v(k) = -\underline{B}^T \cdot \eta(k) \quad (6b)$$

The shoulder suffix T in the above equation stands for a transposed matrix; namely, $\underline{A}^T$, $\underline{B}^T$ and $\underline{C}^T$ stand for the transposed matrices of the matrices $\underline{A}$, $\underline{B}$ and $\underline{C}$, respectively, and k varies from 0 to (n−1), and k(n)=0.

As can be seen from the comparisons of the equations (4a) and (4b) with the equations (6a) and (6b), the equations (6a) and (6b) represent a dual system 9 with respect to the above enlarged system 40 as expressed by the equations (4a) and (4b) under the condition of being disconnected from normally absent disturbance d(k) and the preset temperature values r(k). Therefore, the variables v(k) can be considered to be the output from the dual system 9 with respect to the enlarged system 40 in response to application of the error e(k) between the preset value r(k) and the controlled variable y(k), which dual system 40 is under the conditions of being disconnected from normally absent disturbance d(k) and the preset temperature values r(k).

Thus, such renewed values $\hat{r}(k+1)$ of the adjustment input which reduce the errors e(k) between the preset temperature values r(k) and the controlled variables y(k) can be determined based on the values $\hat{r}(k)$ of the adjustment input in the preceding cycle and the output v(k) from the dual system in response to application of the errors e(k) between the preset temperature values r(k) and the output variables y(k) of the preceding cycle.

In the previous control apparatus of U.S. Pat. No. 5,009,442 issued Mar. 24, 1992, to achieve satisfactory control, it was necessary for the input of the controller to include both the furnace inside temperatures and the heater temperatures. This was caused because the order m of the controlled variables y(k) in the previous control apparatus was smaller than the order s of the state variables (m=3 s=6). More particularly, in the previous control apparatus, the coefficients $A_m$, $B_m$ and $C_m$ were s-row s-column, s-row p-column and m-row s-column matrices, respectively, and with such matrices, the time necessary for renewing the adjustment input was long.

In the invention, however, all the state variables x(k) are used as controlled variables y(k), so that the order m of the controlled variables is the same as the order s of the state variables (s=m), and the calculating time of the adjustment input renewal is shortened. The use of all the state variables x(k) as the controlled variables y(k) is made possible by controlling the temperatures of furnace heaters 2 by the secondary controller 35; namely, by treating the combination of the furnace 1 and the secondary controller 35 as the unitary controller-added-furnace 1C and by placing such combination 1C under the control of the primary controller 12.

III. Example

FIG. 6C shows an example of the result of control by the apparatus of the invention in comparison with that of the prior art. The abscissa is time in minutes and the ordinate is temperature in ° C. at the central inside portion of the furnace. The curve 4 represents a preset temperature pattern, the curve 1 shows the control result by a conventional cascade control apparatus without the adjustment input, the curve 2 shows that by a cascade control apparatus of the invention after four times of learning, and the curve 3 shows that by a single conventional controller without the adjustment input. As compared against the curves 1 and 3 of the prior art, the curve 2 of the invention demonstrates considerable improvement in terms of tracking the preset temperature change pattern with time of the curve 4. Furthermore, it has been confirmed by tests that the calculating time for renewing the adjustment input can be reduced by about 40% as compared with that by the previous control apparatus of U.S. Pat. No. 5,099,442 issued Mar.

24, 1992. Thus, the above-mentioned object of the invention has been fulfilled.

Figure 2:
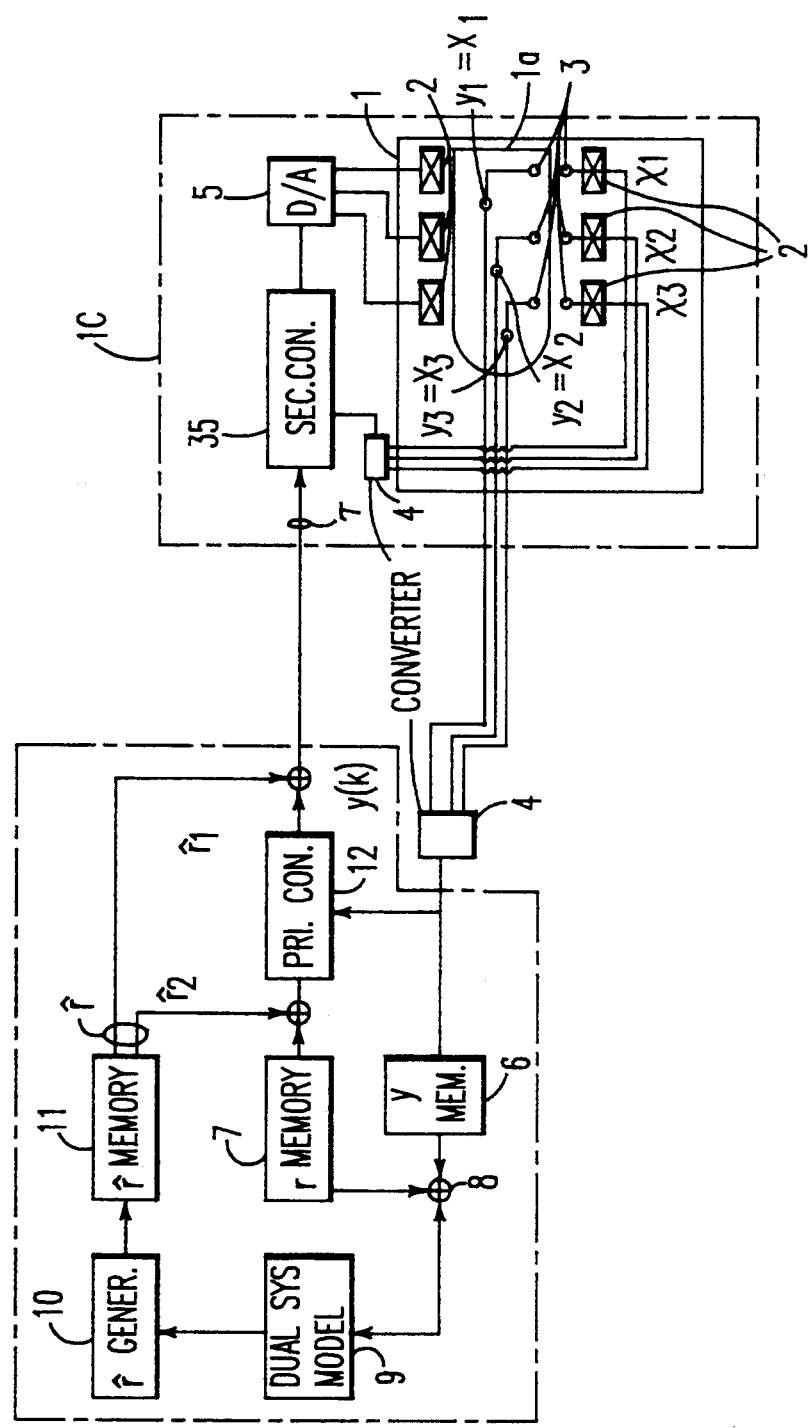
FIG. 2 is an overall schematic diagram of the embodiment of FIG. 1 with emphasis on the furnace and the secondary controller.

In the embodiment of FIG. 2, three heaters 2 each having a temperature sensor 3 are disposed at the front, central and rear portions of a furnace 1, respectively. The number and position of the heaters are not restricted to those of this embodiment. The secondary controller 35 connected to the furnace heaters 2 is capable of individually controlling the temperature of each of the heaters 2. The primary controller 12 controls temperatures at a plurality of locations, e.g., three locations associated with the three heaters 2, and it is of multiple variable type. It is also possible to use one secondary controller 35 and one primary controller 12 for each furnace heater 2.

FIG. 7 shows a flow chart of operation of a cascade furnace temperature control apparatus of the invention using adjustment input. At step 101, it is checked whether adjustment input ($\hat{r}$) is stored or not. When no adjustment input is stored, the control apparatus is initialized in step 102 by storing data, such as preset furnace inside temperature values r defining the temperature change pattern with time, the matrices $\underline{A}$, $\underline{B}$ and $\underline{C}$ of the enlarged system 40, the transposed matrices $\underline{A}^T$, $\underline{B}^T$ and $\underline{C}^T$ of the dual system 9, the equations (4a), (4b), (6a), (6b) for calculation and the like, in a suitable memory (not shown). In step 103, the control apparatus operates so as to control the furnace temperatures by using the data stored in the step 102, and step 104 is to evaluate the control result. If the control result is not good, the values of the adjustment input r are renewed in step 105 and the renewed values are stored in the adjustment input memory 11. Such renewal of the adjustment input values is repeated until the control result or the temperature change becomes good. When the control result is evaluated as good at the step 104, step 106 checks whether to continue the operation or not. To continue the operation, the control returns to the step 103 for repeating the control of the furnace 1 by using the stored values of the adjustment input ($\hat{r}$) until the end of a scheduled run. When continuation is not selected at the step 106, the control finishes.

FIG. 8 illustrates a process for building a system for generating the values of the adjustment input $\hat{r}$. At step 201, various constants of a model for the controller-added-furnace 1C including the secondary controller 35 and the furnace 1, more particularly the matrices $A_m$, $B_m$ and $C_m$ of FIG. 4, are identified, for instance, by applying a rectangular input signal S of FIG. 5 to the input side of the secondary controller 35 and processing the output curve T of FIG. 5 by the generalized least squares method. Step 202 is for identifying a model of the primary controller 12 by determining the real coefficients $F_1$ and $F_2$ of FIG. 4. As to the enlarged system 40 of FIGS. 1, 2 and 3, the equations (4a), (4b) and the matrices $\underline{A}$, $\underline{B}$ and $\underline{C}$ are determined in step 203. As to the dual system 9 of FIGS. 1 and 2, the equations (6a), (6b) and the transposed matrices $\underline{A}^T$, $\underline{B}^T$ and $\underline{C}^T$ are determined in step 204. Step 205 sets the equation 5 for determining the renewed values $\hat{r}(k+1)$ based on the previous cycle values r(k) thereof and the output v(k) from the dual system 9, so as to complete the building of the system for generation of the adjustment input values.

As described in detail in the foregoing, the control apparatus of the invention uses a cascade system; namely, it controls the temperatures of furnace heaters by a secondary controller and the input to the secondary controller is determined by a primary controller so as to obtain the desired furnace inside temperatures. Whereby, the following outstanding effects are achieved.

(1) The time necessary for renewal calculation of the adjustment input is shortened by reducing the order of the dual system.

(2) The output from the primary controller is used as the input set values of the secondary controller for controlling the temperatures of the furnace heaters, and conversion of the primary controller output into heater manipulating signals is eliminated and the control speed is improved.

(3) In the controller-added-furnace including the furnace and the secondary controller, the response of the furnace temperature is quick due to the secondary controller, and a model for such controller-added-furnace can be quickly identified by fast acquisition of related data with elapse of time.

What is claimed is:

1. A cascade control apparatus for controlling inside temperature (y) of a furnace with heaters by a primary controller so as to run the furnace in repetition of a certain temperature change pattern with time, the pattern being given by a set of present temperature values (r) at a number of points in the furnace for a cycle of the repetition, the apparatus comprising a secondary controller connected between the primary controller and the furnace and adapted to minimize a difference between a heater temperature (x) and an output manipulating signal ($\tau$) from the primary controller, an output memory storing values of the furnace inside temperature (y) for a cycle of the repetition of temperature change pattern, an adjustment input memory storing values of adjustment input ($\hat{r}$) for a cycle of the repetition and being adapted to apply the adjustment input ($\hat{r}$) to an enlarged system including the furnace and the primary and secondary controllers in synchronism with the application of the preset temperature value (r) to the enlarged system, a dual system model with respect to the enlarged system under condition of being disconnected from the preset temperature values (r), an order of the enlarged system being the same as said number of points in the furnace for the preset temperature values (r), and an adjustment input generator which renews the values of the adjustment input $\hat{r}$ at the end of each cycle of the repetition based on a combination of the adjustment input ($\hat{r}$) values in the preceding cycle and outputs (v) from the dual system model in response to application of errors (e) between the preset temperature values (r) and the inside temperature (y) values in the preceding cycle so as to reduce the errors (e) in next cycle of the repetition.

2. A cascade control apparatus as set forth in claim 1, wherein the primary controller is simulated by a model with real coefficients, the furnace with heaters including the secondary controller is simulated by a model with real coefficients by using measured variation of the furnace inside temperature (y) in response to application of a rectangular input signal to input side of the secondary controller, and the dual system model of the enlarged system is calculated based on both the model for the primary controller and the model for the furnace with heaters including the secondary controller.

3. A cascade control apparatus as set forth in claim 1, wherein the furnace has a plurality of inside temperature sensors and a plurality of heaters with temperature sensors, respectively, the secondary controller is a multi-variable controller capable of individually controlling each of said furnace heaters, and the primary controller is a multi-variable controller connected to both the plurality of furnace inside temperature sensors and the secondary controller.

* * * * *